United States Patent
Ozturk et al.

(10) Patent No.: US 7,027,819 B2
(45) Date of Patent: Apr. 11, 2006

(54) METHOD AND APPARATUS FOR DETERMINING A LOCATION OF A MOBILE RADIO

(75) Inventors: Osman Ozturk, Enschede (NL); Rinke Terpstra, Borne (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 657 days.

(21) Appl. No.: 09/988,225

(22) Filed: Nov. 19, 2001

(65) Prior Publication Data

US 2003/0096620 A1    May 22, 2003

(51) Int. Cl.
*H04Q 7/20* (2006.01)

(52) U.S. Cl. .............. 455/456.1; 455/556.5; 455/404.2; 455/524; 455/525; 342/357.1; 342/457; 342/450; 342/451

(58) Field of Classification Search ............ 455/456.1, 455/556.5, 404.2, 524, 525; 342/357.1, 457, 342/450, 451, 463

See application file for complete search history.

(56) References Cited

U.S. PATENT DOCUMENTS

| | | | |
|---|---|---|---|
| 5,058,200 A | 10/1991 | Huang et al. | |
| 5,570,412 A * | 10/1996 | LeBlanc | 455/456.2 |
| 5,602,903 A | 2/1997 | LeBlanc et al. | |
| 5,758,288 A * | 5/1998 | Dunn et al. | 455/456.5 |
| 6,011,974 A * | 1/2000 | Cedervall et al. | 455/456.4 |
| 6,061,561 A * | 5/2000 | Alanara et al. | 455/456.1 |
| 6,128,481 A * | 10/2000 | Houde et al. | 455/404.2 |
| 6,351,642 B1 * | 2/2002 | Corbett et al. | 455/442 |
| 6,671,506 B1 * | 12/2003 | Lee | 455/406 |
| 6,757,545 B1 * | 6/2004 | Nowak et al. | 455/456.2 |
| 2001/0036827 A1 * | 11/2001 | Edlund et al. | 455/432 |
| 2002/0034947 A1 * | 3/2002 | Soliman | 455/436 |
| 2005/0075114 A1 * | 4/2005 | Dennison et al. | 455/456.1 |

* cited by examiner

*Primary Examiner*—Nick Corsaro
*Assistant Examiner*—Minh H. Dao
(74) *Attorney, Agent, or Firm*—Nixon & Vanderhye P.C.

(57) ABSTRACT

Cell coordinates available in the radio network is used to determine an area where the mobile radio is located and does not rely upon mobile radio measurements. Such cell coordinates for cells currently associated with the mobile radio are used by the radio network to determine a location of the mobile radio. Those current cells may include cells that are candidates for supporting a communication with the mobile radio, an active set of cells, cells that are currently supporting communication with the mobile radio, or some other set of cells geographically associated with the mobile radio.

22 Claims, 4 Drawing Sheets

METHOD AND APPARATUS FOR DETERMINING A LOCATION OF A MOBILE RADIO

FIELD OF THE INVENTION

The present invention relates generally to wireless communication systems, and in particular, to a method and apparatus for determining the location of a mobile radio in a wireless communications system.

BACKGROUND AND SUMMARY

An important aspect of any mobile communications system is to determine the position of each mobile radio in order to provide one or more services that involve the mobile radio. Indeed, the central feature of mobile communications is "mobility," and mobility is managed by a radio network operator based on the radio network being aware of the current location of each mobile radio. Mobile location information allows the radio network to page the mobile terminal and route a mobile-terminating call to wherever the mobile terminal is located. It also allows visiting networks to provide service to mobile radios.

Typically, a mobile terminal registers with the network each time it enters a new location area, registration area, paging area, or cell. That location is still a fairly coarse measurement depending on the size of that area/cell. The larger the area/cell, the less accurate the location information for the mobile radio. In addition, there are good reasons not to have the mobile terminal send registration messages every time it enters or leaves a relatively small sized area/cell including reduced signaling overload across the radio interface and reduced administration associated with handling a larger volume of registration messages.

Even if the mobile radio reports its position at the cell level, that position is still not particularly accurate. This accuracy is further undermined when the mobile radio is communicating with a set of cells, i.e., having a mobile connection in a diversity handover situation. This set of cells is called the active set. Base station transmissions from cells in the active set, and from "candidate cells" for the active set, are measured by the mobile station. The mobile station updates its active set based upon the signal quality or signal strength of the measured signals of the active set cells and candidate cells. Having multiple cells support a mobile connection makes it unclear in which of the cells the mobile radio is actually located. One approach is to assume the mobile radio is located in the active set cell with the highest signal strength/lowest path loss. However, this approach involves assumptions and relies on measurements made by the mobile radio and communicated to the radio network. The assumptions may be wrong, the measurements may be inaccurate, and the communication over the radio interface may be corrupted.

It would therefore be desirable to have a more reliable and accurate way to determine the position of a mobile radio that is not complicated, expensive, or time consuming. Such a determination preferably should not depend on measurements made by the mobile radio. Ideally, the method of determining a mobile's position should be able to take advantage of information relating to cells currently in a mobile's active set.

The present invention uses cell location information available in the radio network to determine an area where the mobile radio is located and does not rely upon mobile radio measurements. Such cell location information for cells currently associated with the mobile radio is used by the radio network to determine a location of the mobile radio. Those current cells may include, for example, cells that are members of or candidates for an active set of cells, cells that are currently supporting communication with the mobile radio in diversity handover, or some other group of cells geographically associated with the mobile radio. The cell location information defines one or more boundaries of each cell and is stored in the radio network. Coordinates of the boundary positions for each of the cells currently associated with the mobile radio are used to define the mobile location.

A boundary position includes a horizontal coordinate and vertical coordinate. The horizontal coordinates of all available boundary positions are compared, and one or more of them is selected. Similarly, the vertical coordinates for each cell in the known. Non-limiting examples of cells includes: macro-cells, micro-cells, pico-cells, registration areas, location areas, base station cells, and base station sector cells.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
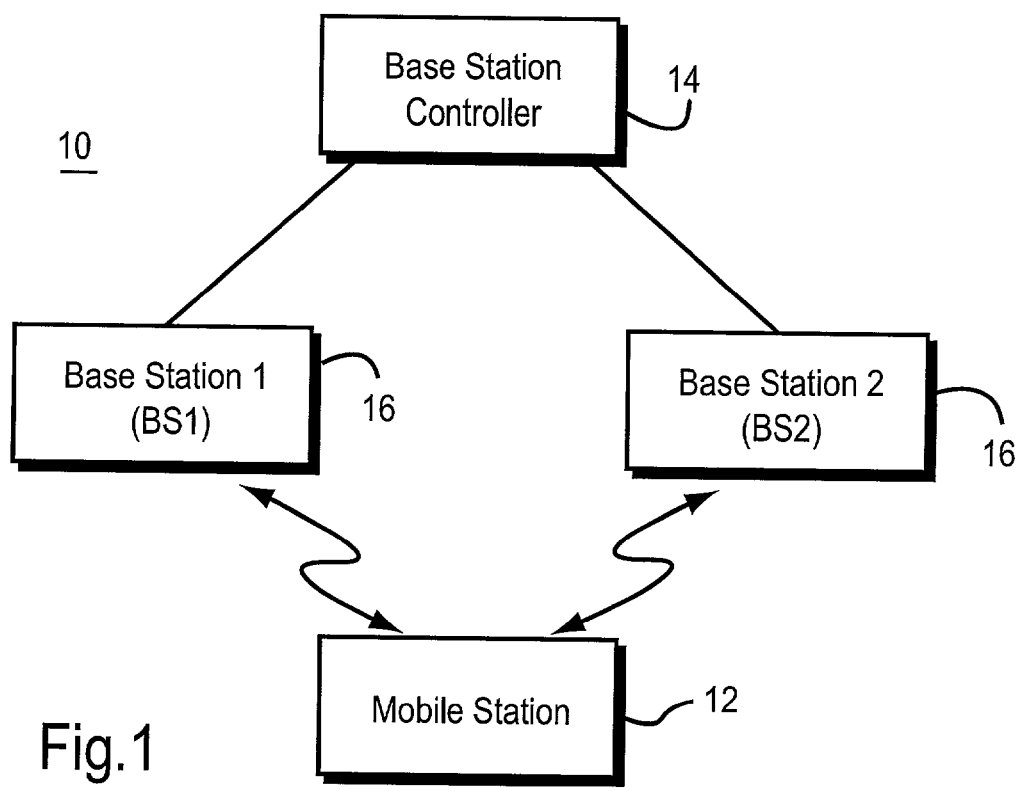
FIG. 1 is a simplified drawing of a mobile communications system in which the present invention may be employed.

FIG. 1 illustrates a simplified mobile communications system 10 which includes a mobile station 12 communicating with two base stations 16 including BS1 and BS2. Both base stations 16 are coupled to a base station controller 14. FIG. 1 illustrates an example where the mobile station is in a diversity or soft handover between two base stations. If each base station only supports one cell, then the active set of cells in ths example includes two cells. Alternatively, each base station may support multiple cells, e.g., each cell corresponding to one of plural sectors of a base station. Signal transmissions from each cell in the active set, e.g., pilot signals, as well as from other nearby cells that are potential candidates for the active set are monitored by the mobile station. A cell is added to or removed from the active set as its pilot signal either rises or falls below a threshold. Other mechanisms and parameters may be used to select which cells are to be in the mobile radio's active set and how that active set is to be maintained. In addition, although the preferred example embodiment refers to an active set for purposes of illustration, it is to be understood that the present invention may be employed in any situation where multiple cells are currently in geographical proximity of a mobile radio.

Figure 2:
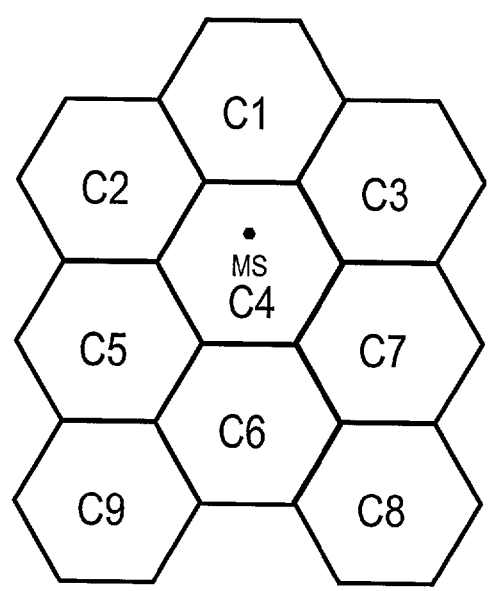
FIG. 2 is a diagram illustrating a mobile station in a grid of cells.

FIG. 2 illustrates a matrix of cells where each cell either corresponds to a single base station or base station sector such that one base station may service multiple sectors/cells. The mobile station (MS) is currently located in cell C4 and monitors transmissions from cell C4 as well as one or more of the adjacent cells C1–C3 and C3–C9. Typically, the mobile station's active set of cells is stored in the base station controller 14 or in another supervisory node (not shown in FIG. 1) coupled to the base station controller 14.

Figure 3:
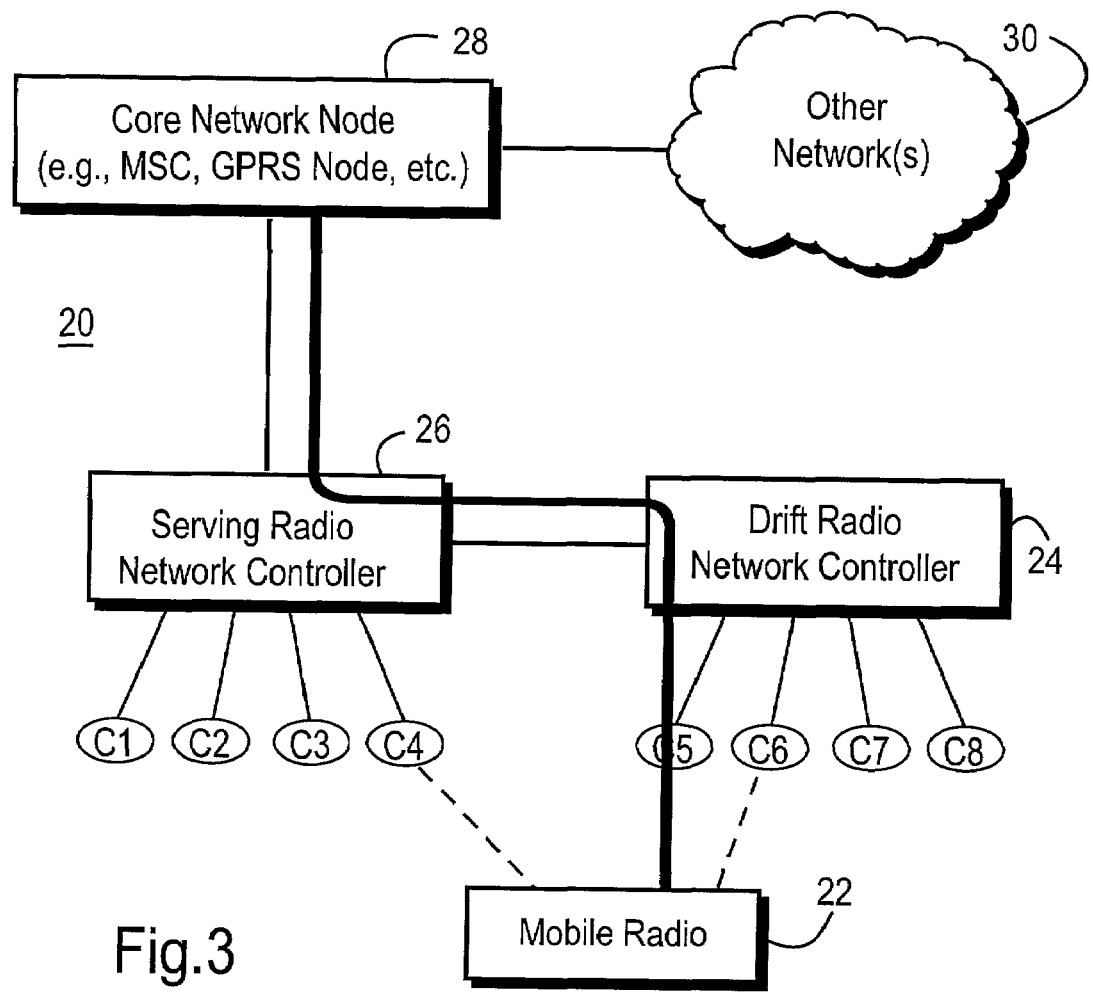
FIG. 3 illustrates a more detailed function block diagram of a particular type of mobile radio communications system in which the present invention may be employed.

FIG. 3 illustrates another mobile communications system in which the present invention may be employed in a Universal Mobile Telecommunications System (UMTS) system. A mobile radio (sometimes referred to as a user equipment (UE)) 22 is located in cell C5 which is one of several cells C5–C8 served by a drift radio network controller (DRNC) 24. Initially, the connection with the mobile station (shown as a dashed line) was established from a core network node 28 (such as a mobile switching center (MSC), a GPRS node, etc.), through a serving radio network controller (SRNC) 26 in one of the cells that is supervised by the SRNC 26, i.e., C1–C4. Due to movement of the mobile radio 22, the connection is shifted so that the dominant connection to the radio network is through cell C5 which is controlled by the DRNC 24. However, the mobile radio 22 may well have secondary, less dominant links (as shown by the dashed lines) in a soft handover situation with cells adjacent to C5 including cells C4 and C6. In this example scenario, the serving radio network controller 26 maintains the active set of cells for mobile radio 22. Of course, another node may do this.

Figure 4:
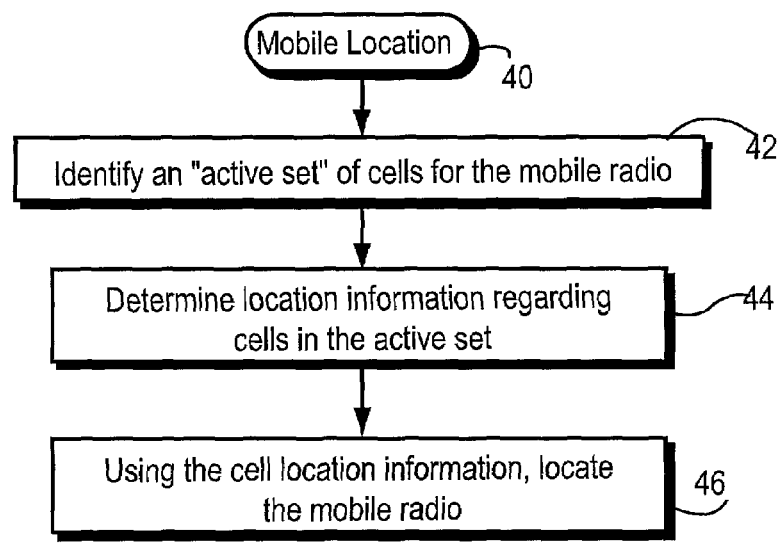
FIG. 4 illustrates example mobile location procedures in accordance with the general embodiment of the present invention.
Figure 5:
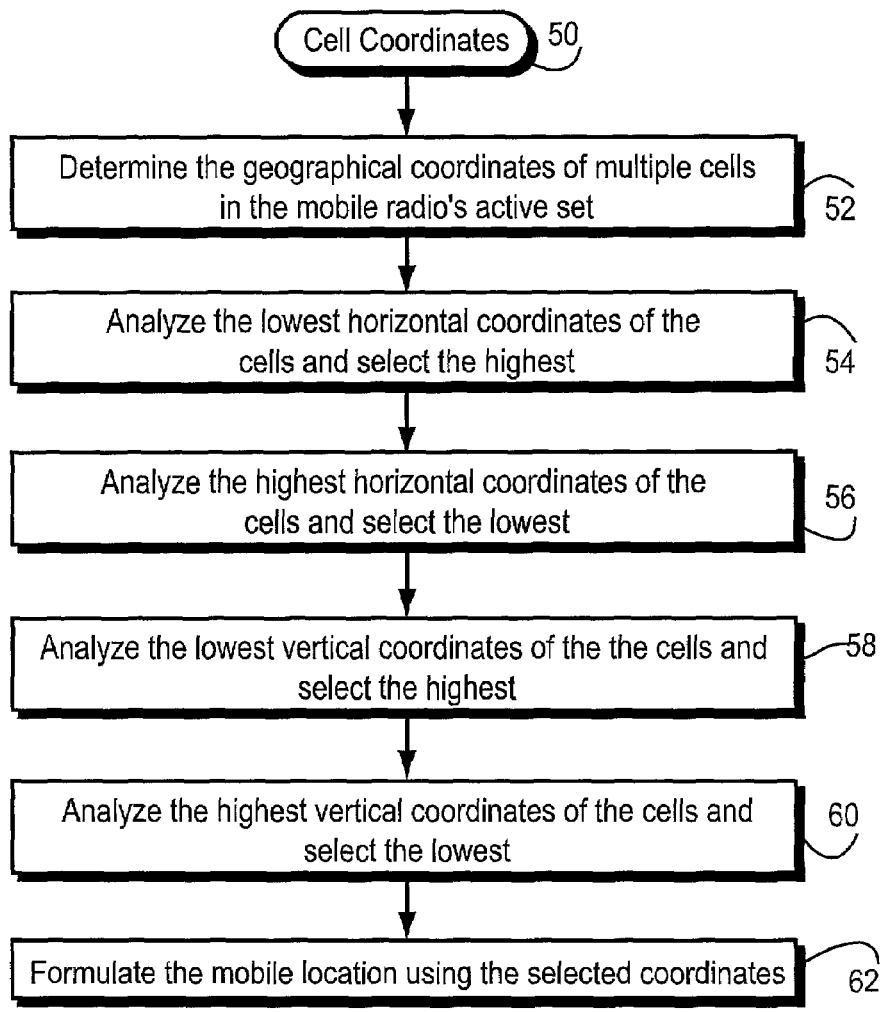
FIG. 5 illustrates more detailed example procedures for implementing the present invention in a preferred, non-limiting, example embodiment.

Reference is now made to the Mobile Location routine (block 40) shown in FIG. 4 illustrating example procedures for implementing a general embodiment of the present invention. A node in the radio network, such as the base station controller 14, one of the radio network controllers 24, 26, or a core network node 28, identifies an active set of cells (or some other associated set of cells) for the mobile radio (block 42). That node determines cell location information regarding the cells in the active set (block 44). Using the cell location information, the node determines the location of the mobile radio (block 46).

A more detailed, but still non-limiting example embodiment is shown in flowchart form as a "Cell Coordinate" routine (block 50). The geographical coordinates of multiple cells in the mobile radio's active set are determined (block 52). The lowest horizontal coordinates of those cells (e.g., latitudes) in the active set are analyzed, and from that group, the horizontal coordinate with the highest value is selected (block 54). The highest ones of the horizontal coordinates of the active set cells are analyzed, and from that group, the horizontal coordinate with the lowest value is selected (block 56). Similarly, the lowest vertical coordinates of the cells in the active set (e.g., longitudes) are analyzed, and the one with the highest value is selected (block 58). The highest vertical coordinates of the active set cells are analyzed, and the lowest one of that group is selected (block 60). The mobile location is formulated using the selected coordinates from blocks 52–60 (block 62).

Thus, the preferred, non-limiting, example algorithm may be summarized as follows:
- group the lowest horizontal coordinates (or latitudes) in the active cell set and select the highest
- group the highest horizontal coordinates (or latitudes) and select the lowest
- group the lowest vertical coordinates (or longitudes) and select the highest
- group the highest vertical coordinates (or longitudes) and select the lowest.

These four coordinates give the boundary points of a rectangle which corresponds to the location of the user. That rectangle defines an area that is smaller than one of the cells.

Figure 6:
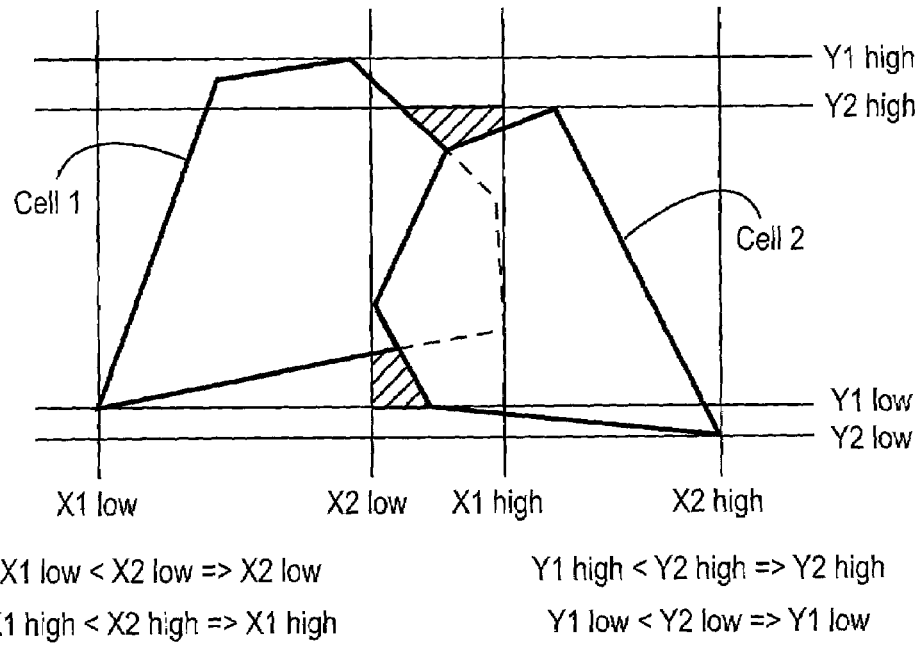
FIG. 6 is a graph illustrating one mobile location determination example with two cells in a mobile's active set.
Figure 7:
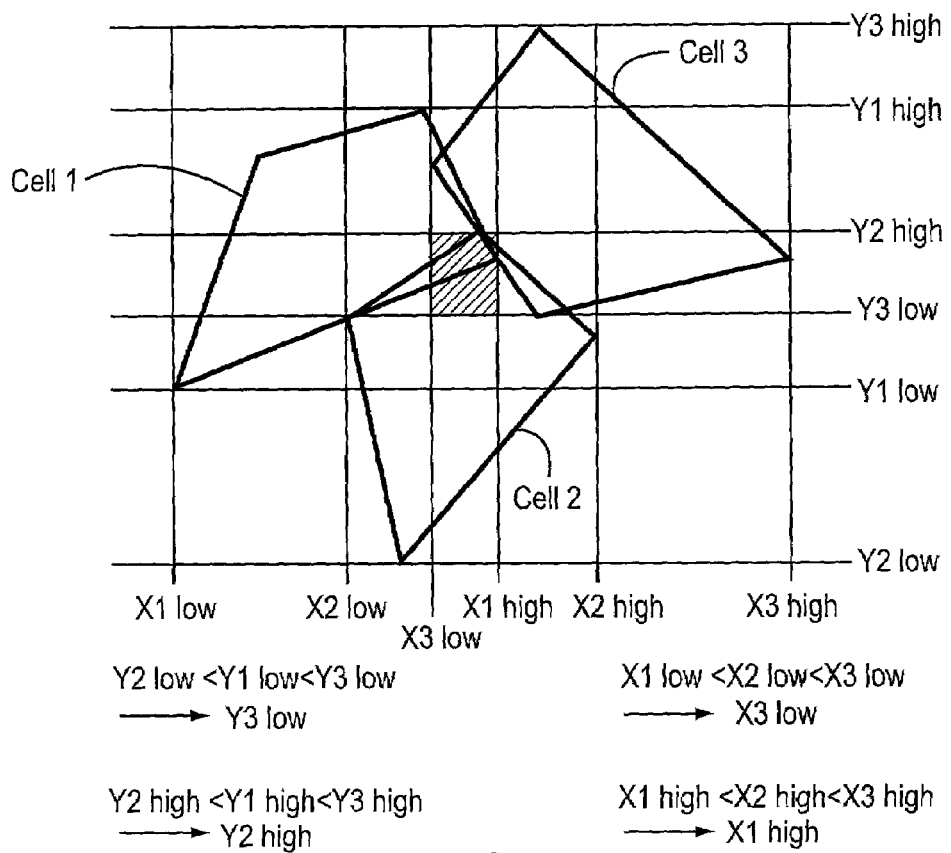
FIG. 7 illustrates another mobile location determination example with three cells in the mobile station's active set.

Two examples are now illustrated in FIGS. 6 and 7. In FIG. 6, there are two cells in the mobile station's active set corresponding to cell 1 and cell 2. FIG. 6 shows the lowest horizontal component of cell 1 is Y1 low, and the lowest for cell 2 is Y2 low. The highest horizontal component for cells 1 and 2 correspond to Y1 high and Y2 high. Similar vertical components are provided for both cells including X1 low, X2 low, X1 high, and X2 high.

As shown in the inequalities below the graph in FIG. 6, Y1 low is selected because it is the highest of the lowest horizontal coordinates. Y2 high is selected because it is the lowest one of the highest horizontal coordinates. X2 low is selected because it is the highest of the lowest vertical coordinates. X1 high is selected because it is the lowest of the highest vertical coordinates. The selected coordinates Y1 low, Y2 high, X2 low, and X1 high define a rectangle corresponding to the mobile's current location. The rectangle is smaller that either of the cells, and therefore, more accurately defines the mobile's current location. Moreover, measurements from the mobile are not needed to determine these coordinates.

In FIG. 7, there are three cells in the mobile station's active set corresponding to cell 1, cell 2, and cell 3. The lowest horizontal component of cell 1 is Y1 low, the lowest for cell 2 is Y2 low, and the lowest for cell 3 is Y3. The highest horizontal component for cells 1, 2, and 3 correspond to Y1 high, Y2 high, and Y3 high. Similar vertical components are provided for both cells including: X1 low, X2 low, X3 low, X1 high, X2 high, and X3 high.

As shown in the inequalities below the graph in FIG. 7, Y3 low is selected because it is the highest of the lowest horizontal coordinates. Y2 high is selected because it is the lowest one of the highest horizontal coordinates. X3 low is selected because it is the highest of the lowest vertical coordinates. X1 high is selected because it is the lowest of the highest vertical coordinates. The selected coordinates Y3 low, Y2 high, X3 low, and X1 high define a rectangle/square corresponding to the mobile's current location. The rectangle/square is much smaller than any of the cells, and therefore, more accurately defines the mobile's current location. Indeed, the more cells in the set, the smaller the rectangle/square, and the more accurate the location. Again, measurements from the mobile are not needed to determine these coordinates.

While the present invention has been described with respect to particular example embodiments, those skilled in the art will recognize that the present invention is not limited to those specific embodiments described and illustrated herein. Different formats, embodiments, adaptations besides those shown and described, as well as many modifications, variations and equivalent arrangements may also be used to implement the invention. Again, the term "cell" in the context of the present invention is understood broadly to cover any geographical area in a cellular communications system whose boundaries are known. Accordingly, it is intended that the invention be limited only by the scope of the claims appended hereto.

What is claimed is:

1. A method for determining a location of a mobile radio, comprising:
   determining location information for plural cells in a set of cells associated with the mobile radio, and
   using the cell location information to determine a location of the mobile radio,
   wherein the cell location information includes information defining one or more boundaries of a coverage area corresponding to each of the cells,
   wherein the cell location information includes coordinates of boundary positions for each cell and each boundary position includes a horizontal coordinate and a vertical coordinate,
   the method further comprising:
   comparing the horizontal coordinates;
   selecting one or more of the horizontal coordinates;
   comparing the vertical coordinates;
   selecting one or more of the vertical coordinates; and
   using the selecting horizontal and vertical coordinates to define the mobile radio location.

2. The method in claim 1, wherein the set of cells includes an active set of cells for the mobile radio.

3. The method in claim 1, wherein the set of cells includes cells that are cells currently supporting a handover communication with the mobile radio.

4. The method in claim 3, wherein the set of cells includes cells that are candidates for supporting a communication with the mobile radio.

5. The method in claim 1, wherein a pair of horizontal coordinates and a pair of vertical coordinates are selected to define the mobile radio location.

6. The method in claim 1, wherein a first selected horizontal coordinate corresponds to a highest one of the lowest horizontal coordinates of each of the cell boundary coordinates, a second selected horizontal coordinate corresponds to a lowest one of the highest horizontal coordinates of each of the cell boundary coordinates, a first selected vertical coordinate corresponds to a lowest one of the highest vertical coordinates of each of the cell boundary coordinates, and a second selected vertical coordinate corresponds to a highest one of the lowest vertical coordinates of each of the cell boundary coordinates.

7. A method for determining a location of a mobile radio comprising:
   obtaining previously determined coordinates of plural cells in a set of cells associated with the mobile radio, where each coordinate may be defined with a horizontal coordinate and a vertical coordinate;
   analyzing a first group of lowest horizontal coordinates for the set of cells and selecting a highest coordinate from the first group;
   analyzing a second group of highest horizontal coordinates for the set of cells and selecting a lowest coordinate from the second group;
   analyzing a third group of lowest vertical coordinates for the set of cells and selecting a highest coordinate from the third group;
   analyzing a fourth group of highest vertical coordinates for the set of cells and selecting a lowest coordinate from the fourth group;
   determining a location of the mobile radio using the selected coordinates from some or all of the first, second, third, and fourth groups.

8. The method in claim 7, wherein the determining step includes determining a location of the mobile radio using the selected coordinates from each of the first, second, third, and fourth groups.

9. The method in claim 7, wherein horizontal coordinates represent latitude values and vertical coordinates represent longitude values.

10. The method in claim 7, wherein the set of cells includes an active set of cells for the mobile radio.

11. The method in claim 10, wherein the set of cells includes cells that are candidates for the active set.

12. The method in claim 7, wherein the set of cells includes cells that are currently supporting a handover communication with the mobile radio.

13. A node in or coupled to a radio access network for determining a location of a mobile radio comprising electronic circuitry configured to perform the following tasks:
   determine a set of cells associated with the mobile radio;
   determine cell location information for cells in the set of cells; and
   use the cell location information to determine a location of the mobile radio,
   wherein the cell location information includes information defining one or more boundaries of a coverage area corresponding to each of the cells in the set,
   wherein the location information includes coordinates of boundary positions for each cell and wherein each boundary position includes a horizontal coordinate and a vertical coordinate,
   wherein the electronic circuitry is further configured to:
   compare the horizontal coordinates;
   select one or more of the horizontal coordinates;
   compare the vertical coordinates;
   select one or more of the vertical coordinates; and
   use the selected horizontal and vertical coordinates to define the mobile radio location.

14. The node in claim 13, wherein the set of cells includes cells that are in an active set for the mobile radio.

15. The node in claim 13, wherein the set of cells includes cells that are candidates for supporting a communication with the mobile radio.

16. The node in claim 13, wherein the set of cells includes cells that are currently supporting a handover communication with the mobile radio.

17. The node in claim 13, wherein the electronic circuitry is further configured to select one pair of horizontal coordinates and one pair of vertical coordinates to define the mobile radio location.

18. The node in claim 13, wherein a first selected horizontal coordinate corresponds to a highest one of the lowest horizontal coordinates of the cell boundary coordinates, a second selected horizontal coordinate corresponds to a lowest one of the highest horizontal coordinates of the cell boundary coordinates, a first selected vertical coordinate corresponds to a lowest one of the highest vertical coordinates of the cell boundary coordinates, and a second selected vertical coordinate corresponds to a highest one of the lowest vertical coordinates of the cell boundary coordinates.

19. The node in claim 13, wherein the electronic circuitry is further configured to:
   obtain coordinates of cells in the set;
   analyze a first group of lowest horizontal coordinates for the set of cells and select a highest coordinate from the first group;
   analyze a second group of highest horizontal coordinates for the set of cells and select a lowest coordinate from the second group;
   analyze a third group of lowest vertical coordinates for the set of cells and select a highest coordinate from the third group;
   analyze a fourth group of highest vertical coordinates for the set of cells and select a lowest coordinate from the fourth group;
   determine a location of the mobile radio using the selected coordinates from some of the first, second, third, and fourth groups.

20. The node in claim 19, wherein the electronic circuitry is further configured to determine a location of the mobile radio using the selected coordinates from each of the first, second, third, and fourth groups.

21. The node in claim 19, wherein horizontal coordinates represent latitude values and vertical coordinates represent longitude values.

22. The node in claim 19, wherein the node is any one of a base station, a base station controller, a radio network controller, or a core network node.

* * * * *